United States Patent [19]

Boyenval

[11] Patent Number: 4,905,363
[45] Date of Patent: Mar. 6, 1990

[54] MODULAR PROCESS FOR DISMANTLING LIGHT AUTOMOBILE VEHICLES

[76] Inventor: Hugues Boyenval, 3, rue du Moulin, 21380 Messigny-et-Vantoux, France

[21] Appl. No.: 206,516

[22] Filed: Jun. 14, 1988

[30] Foreign Application Priority Data

Jun. 16, 1987 [FR] France ................................ 87 08389

[51] Int. Cl.⁴ .......................... B30B 9/32; B23P 19/04; B65H 1/26
[52] U.S. Cl. .................................. 29/403.2; 29/403.1; 29/403.3; 29/407; 29/426.1; 29/426.3; 414/222; 414/266
[58] Field of Search .................. 29/403.2, 426.1, 426.4, 29/403.1, 403.3, 407, 426.3, 430, 794, 403.4; 100/901; 414/222, 227, 266

[56] References Cited

U.S. PATENT DOCUMENTS

| | | | |
|---|---|---|---|
| 2,757,447 | 8/1956 | Barényi | 29/794 X |
| 2,953,848 | 9/1960 | Cadillac et al. | 29/407 |
| 3,685,128 | 8/1972 | Sharp et al. | 29/403.3 |
| 3,747,189 | 7/1973 | Kawasaki | 29/794 X |
| 3,885,292 | 5/1975 | Sharp et al. | 29/403.3 |
| 4,037,302 | 7/1977 | Hollander | 29/403.3 |
| 4,037,302 | 7/1977 | Hollander | 29/403.3 |
| 4,139,180 | 2/1979 | Itani et al. | 29/403.1 |

FOREIGN PATENT DOCUMENTS 139072 11/1960 U.S.S.R. ............................ 29/403.3
139811 11/1960 U.S.S.R. ............................ 29/403.3

OTHER PUBLICATIONS

Detroit Free Press Business Report on Wednesday, 10/29/1969, p. 4B.

Primary Examiner—Howard N. Goldberg
Assistant Examiner—Peter Dungba Vo
Attorney, Agent, or Firm—McAulay, Fisher, Nissen & Goldberg

[57] ABSTRACT

A modular process is provided for dismantling light automobile vehicles with a view to recovering their detached parts and recycling in an organized network. In each module the sum of the times of testing, conveyance, dismantling, recovery, sorting, packing and storing of the parts, pressing and evacuation of the carcasses, with respect to the number of vehicles treated, whatever their original state, remains constant over a determined period. A line is provided for conveying the light automobile vehicles and in this line stations for dismantling by batch of parts and not by unitary parts follow one another. Further logistics are provided for ensuring supply of each station depending on the demand of the operator independently of the operator of the preceding station.

17 Claims, 5 Drawing Sheets

MODULAR PROCESS FOR DISMANTLING LIGHT AUTOMOBILE VEHICLES

BACKGROUND OF THE INVENTION

The present invention relates to a modular process for dismantling light automobile vehicles for recovering and recycling their detached parts with a view to economic valorization thereof.

More than 1,200,000 light vehicles are to be destroyed each year in France. Those involved in such destruction may be summarily classified as follows:

car breakers, those who are generally insufficiently equiped to cope with the whole problem;

scrap merchants, those who demolish automobiles only when justified by the market rate of the metals and scrap iron;

garage mechanics who dismantle some cars for their second-hand market; nevertheless, taking into account the prescriptions of the manufacturers on the one hand, of the price of land or environmental preoccupations on the other hand, garage keepers are more and more hesitant to accumulate wrecks;

individuals who illegally break up cars which are neither evaluated nor evaluatable and escape all the normal trade and control circuits, creating unfair competition for professional car breakers, unsafe environment and, more generally, a precariousness of the profession, considerably discrediting it with regard to the public.

Furthermore, all the drawbacks of the present system of automobile demolition as practiced by the professionals are also known.

Mention will firstly be made of the enormous losses or depreciations of material simply by the vehicles remaining outside, the present average being 6 months per vehicle (blockage of the engines, of the braking circuits, rotting of the seats, corrosion, freezing up, breaking of windscreens, etc. . . ).

To these losses are added the difficulties of dismantling and handling effected outside in an inappropriate environment; in addition, it is difficult to assess the losses due to theft or vandalism of all types.

Other drawbacks follow from the present system which consists rathermore in stacking than in managing; no stock of vehicles or of detached parts is at present really accounted for, whilst the number of references which should be automatically processed is estimated at more than 50,000. The precarious conditions of demolition work in poorly equiped workshops or on totally uncomfortable work-sites considerably aggravate the difficulties of a profession which, in addition, knows nothing of the elementary bases of selling: no structure of reception, no tariffs, no catalogue and even sometimes no service, particularly for dismantling a part from a vehicle. Finally, the incontestable impact of this profession on the environment, whether it be question of problems of aesthetics or of ecology due to the pollution of the ground by rejection of oils, leads to enormous losses of substances due to the lack of organization of a profession which today is completely overcome by its product and its market, and poorly considered by its clientele which should therefore be reconquered.

In order to overcome all the drawbacks of the present system, the need has therefore appeared for a highly industrialized process for demolishing vehicles, on the one hand, in order to absorb the annual quantity of vehicles to be "broken" and, on the other hand, to recover the detached parts thereof and more generally all products likely to be recycled economically. A process for dismantling vehicles has thus been proposed, employing a basic module which may for example treat a constant quantity of vehicles per day, it being observed that, contrary to the assembly of a new vehicle, it is illusory to predetermine operational times for dismantling a used vehicle.

In fact, depending on the state of a vehicle, for example if it was involved in an accident or not, the operations of dismantling and recovery of the parts might vary considerably, not only in time, but also in number; this is the principal structural difficulty which has always limited the professionals totally unsuited to cope with the problem.

SUMMARY OF THE INVENTION

In order to overcome this difficulty, the basic module according to the invention is characterized in that the sum of the times of testing, conveyance, dismantling, recovery, sorting, packing and storing of the parts, pressing and evacuation of the carcasses, with respect to the number of vehicles treated, whatever their original state, remains constant over a determined period by means of the following:

on the one hand, of a line for conveying the light automobile vehicles wherein stations for dismantling by batch of parts and not by unitary parts follow one another;

and, on the other hand of logistics ensuring supply of each station depending on the demand of the operator independently of the operator of the preceding station.

In this context and in order to carry out such a process under particularly advantageous economic conditions due to the extreme reduction of the surfaces occupied by the industrial device which reduces the construction acquisition costs and more seriously the costs of exploitation (cost of energy internal traffic, liaison, monitoring, management, etc. . . ), a structure comprising three superposed functional levels has been provided, such that:

all the operations of conveyance of the light automobile vehicles are effected at the 3rd level, by overhead conveyors which are suspended from the framework of the structure for displacing the light automobile vehicles from one dismantling station to another, except, on the one hand, for the supply of said light automobile vehicles to said dismantling stations which is preferably effected by raising the light automobile vehicles by means of the vertical elevator conveyor type, and except, on the other hand, for the operations of loading and unloading the light automobile vehicles which are carried out on the ground;

all the operations of dismantling, possible washing and conveyance of detached parts are effected at the intermediate level;

all the heavy operations of storing the detached parts and of pressing the dismantled carcasses are effected at ground level thus allowing a lighter compact structure and an easier, rational offer for sale of the spare parts.

It is then possible to effect, in the basic module, dismantling of the vehicles in accordance with the following successive phases or operations, set forth in detail hereinafter;

1. Loading of the light automobile vehicle on an empty swing-tray and supply of said light automobile vehicle onto a suspended overhead conveyor;

2. Operation of testing by auditive, visual, electronic diagnosis of the light automobile vehicle and establishment of the list of dismantling by data-processing with state of the parts;

3. Recovery of the fluids and in particular of the oils and grease, petrol, water with anti-freeze;

4. Dismantling of all the parts except for the engine gear-box the rear axle and wheels by the same operator;

5. Separate conveyance of the detached parts;

6. Dismantling of the wheels and recovery of the wheels;

7. Disconnection of the front axles and of the brakes and then disconnection of the engine, gear-box, starter and driving parts;

8. Washing of the parts recovered in operation 7 at station 28;

9. Selection of the products thus recovered which are then packed, stored and managed by computer for the preparation of the orders;

10. Pressing of the remaining carcasses and evacuation towards metal recuperators and return of the empty swing-trays in order to resume the cycle.

In complement to the device thus described, each of its steps should be studied to determine the importance thereof in the execution of the program for dismantling the vehicles and to integrate the various uncertainties set forth in the preamble.

To this end, it has been proposed to carry out the first operation of dismantling corresponding to phase or operation 4 by one operator who thus obtains complete work independence and in addition, the one operator has effective control; from the beginning up to the end of dismantling of the engine, gear-box, rear axle and wheels. Recalling the hypothesis of a considerable variability in the dismantling times, it has been provided to place in parallel a minimum number of similar stations, each station being supplied upon the demand of each of the operators of these stations, giving them the time necessary and sufficient for each dismantling; furthermore, a zone of accumulation, upstream of these stations, ensures a permanent supply giving the system all its flexibility whilst ensuring smoothness of the work flow; in fact, a wide range of dismantling times can easily be established if the worst case and the optimum case are considered, thanks to which, and by an elementary statistical study, it is possible to determine the number of dismantling stations which should be placed in parallel in order to regularize the flow of vehicles to be "broken", per unit of time.

In this respect a particular advantage of the process will be noted, which allows individual stops of operators automatically compensated by the other stations, this prejudicing only the times.

Furthermore, it is also possible to couple several basic modules, or fractions thereof, by disposing them in parallel, in a structure extended to that end, it merely being necessary to join together the buffer zones allowing accumulation and monitored supply of the dismantling stations; these liaisons are naturally simplified by the technique of conveyance as described in the embodiment which will be given, allowing vehicles to remain on the same rail, which each operator may extract at the opportune moment; in this way, coupling several modules or fraction of a module, means, in fact, elongating the supply rail on the one hand, and extending the evacuation rail on the other hand, which is in fact the supply rail of the following operating stations and this up to the end of the cycle of demolition by unloading the carcasses into a press and evacuating the "packs" thus produced, destined for metal recuperators.

BRIEF DESCRIPTION OF THE DRAWINGS

The invention will be more readily understood on reading the following description with reference to the accompanying drawings, in which.

DESCRIPTION OF THE PREFERRED EMBODIMENTS

Figure 1:
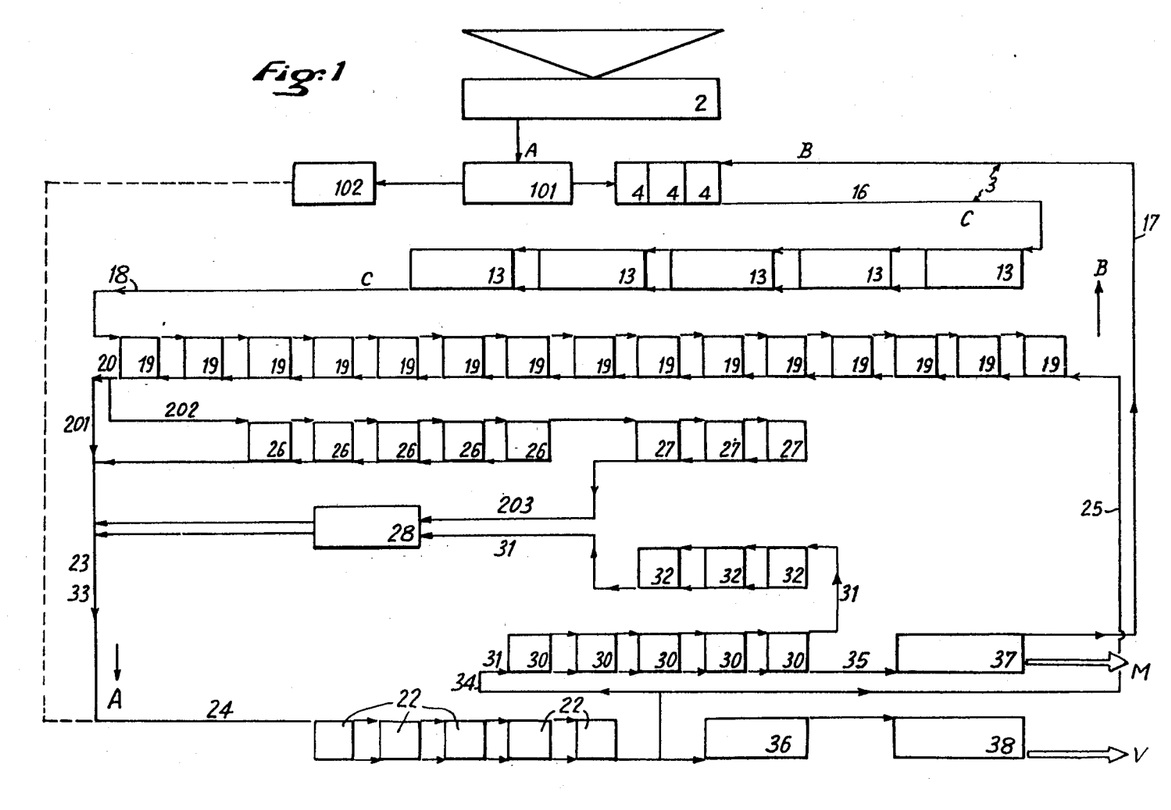
FIG. 1 shows a block diagram of all the sequences of dismantling according to the process from the admission of the light automobile vehicles up to the sale of their recycled and packed or packaged detached parts.

Referring now to the drawings and firstly to FIG. 1, the following embodiment corresponds to the process for dismantling and recovering the detached parts for a constant flow of 150 vehicles per period of 8 hours, or a "break" or dismantling of a vehicle every 3.2 minutes. It is, of course, intended for four-wheeled vehicles weighing less than 2.5 tons, hereinafter referred to as light automobile vehicles.

Figure 4:
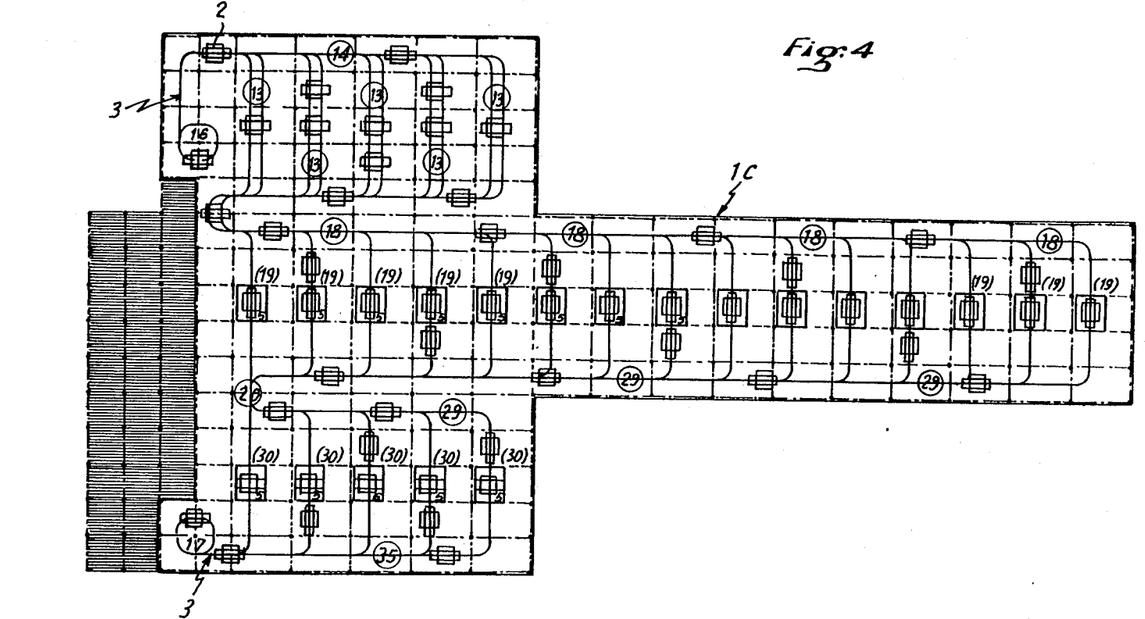

At the entrance of a structure or building 1 (see FIG. 5), the light automobile vehicles 2 undergo a first sorting 101 to eliminate the vehicles which are too damaged to be integrated into the conveyor line 3 of the light automobile vehicles 2. The vehicles set aside during this sorting 101 are sent to an annexed workshop 102 organized in a conventional manner to effect recovery of parts which are evacuated towards packing stations 22 and bins or storage stations 36 before sale. For the other light automobile vehicles 2, they are taken from level A up to level C of structure 1 on three loading stations 4 by means of a vertical elevator section 5 of the conveyor line 3. The light automobile vehicles 2 are taken over in the conveyor line 3 by swing-trays 6 ensuring holding of vehicles 2 and angular positioning thereof both in the same horizontal plane (no rotation of the vehicle on itself) and in the same vertical plane (rise or descent); according to FIGS. 6, the swing-trays 6 are provided with two lateral arms 7 terminating in a cradle 8 supporting the vehicle by abutment underneath the body. The arms 7 are such that they allow the doors of vehicles 2 to open and they are articulated transversely by a motorization 9 for blocking or unblocking the vehicle 2; complementarily, the cradle 8 is provided with punches 10 which are driven into the body of the vehicles 2, ensuring definitive positioning thereof. To avoid any undesirable swinging of the swing-trays 6 during displacements, a conventional rigidifying device is provided, comprising, inter alia, two points of fastening 12 to the rail 11 of the conveyor line 3. Having arrived at the 3rd level (C) of structure 1, the light automobile vehicles 2 are subjected to a series of tests distributed over five stations 13 (see FIG. 4) with common supply of vehicles at 14, and which depends on the demand of the operators at stations 13. At these stations 13, conventional controls are carried out on each light automobile vehicle 2, such as: visual, auditive, electrical, electronic and mechanical controls when possible, in order to note the state of each element of vehicle 2; a codification is, moreover, established destined for the dismantling which will follow, with a view to organization thereof and a better management of the recycled parts. For example, during the tests, it might be indicated that such radiator of such brand name is split. Consequently, it is unnecessary to take precautions when dismantling, on the one hand, and this part should be oriented directly to the recovery of metals and not to the storage of parts for sale. The tests having been made and a card for each vehicle 2 being established for control and computerized management of the parts which will be recovered therefrom, the light automobile vehicles 2 are conveyed completely to level C to supply the successive dismantling stations whereby the rails 11 are directly fixed to the framework 15 of the building or structure 1 (FIG. 5) in accordance with logistics shown schematically in FIG. 4. The rails 11 forming the whole conveyor line 3 are shown in continuous lines in FIG. 4 from the ramp 16 where the vehicles 2 arrive after the loading stations 4 up to the exit ramp 17 terminating at press 37 and return of the empty trays 6 to the loading station 4. The light automobile vehicles 2 are shown at random in the diagram.

Figure 3:
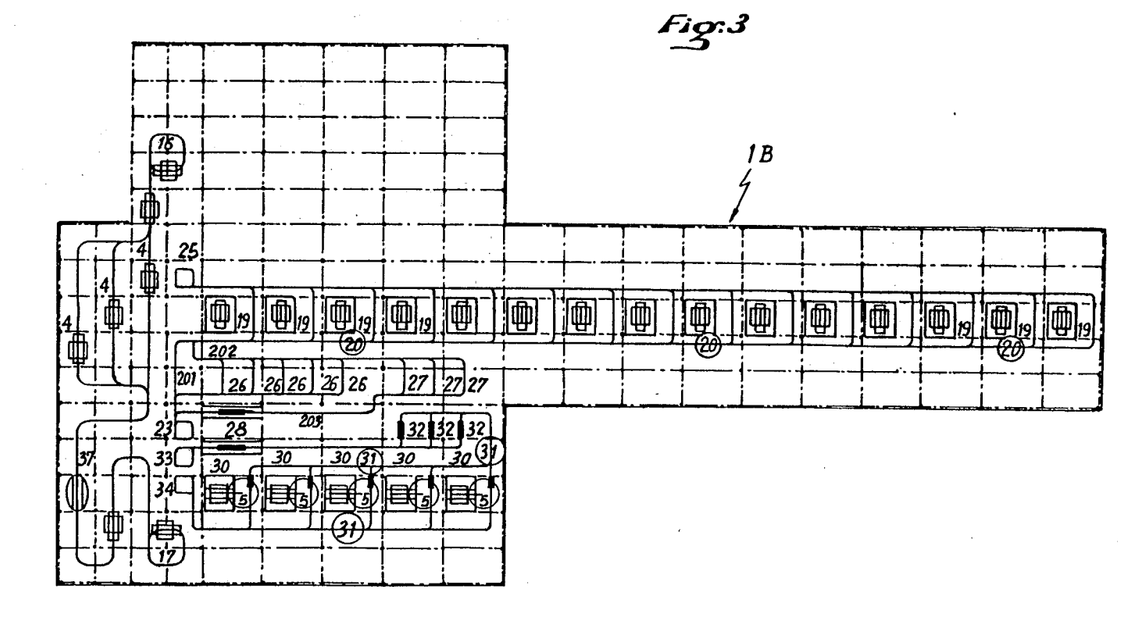

On leaving the test stations 13, the light automobile vehicles 2 are accumulated in a first buffer zone 18 positioning the waiting vehicles 2 level with dismantling stations 19 located at level B, allowing the operators, depending on their own rate, to extract a vehicle 2 from zone 18, by causing it to descend by a vertical elevator of the same type as the vertical elevator section 5, to the dismantling station 19; fifteen stations 19 of the same type are thus disposed in parallel at the centre of the intermediate level B of structure 1 (FIG. 3). Each station 19 is equipped with a complete set of dismantling tools, rendering the operator entirely independent; the light automobile vehicle 2 being dismantled at a station is held by its tray 6, disconnected from its conveyor system and able to rotate freely on itself; the operator then proceeds to dismantle the vehicle 2 completely, leaving only the engines, wheel axles, gear-boxes and their direct accessories. Around each station 19, a new conveyor line 20 supported by the intermediate floor 21 of structure 1, serves to collect the dismantled parts which are disposed in different baskets depending on the destination of the parts pre-noted at stations 13; the operator determines himself the orientation of the baskets circulating on the conveyor 20 by means of magnetic badges for example which will make it possible to direct the parts directly via 201 towards the part storage bank 22, by descent of the baskets concerned at point 23 (FIG. 3) via a helicoidal ram elevator 24, the empty baskets rising to level B, at point 25 in FIG. 3, or towards the five stations 26 for dismantling wheels and tires, followed by dismantling of the front wheel axles, brakes and universal joints on three stations 27; the parts leaving stations 27 are conveyed via 203 to a washing station 28 to be degreased and cleaned, before descending in storage bank 22 at point 23 of level B.

After all the dismantling operations carried out at stations 19, the light automobile vehicles 2 are raised to level C (FIG. 4) of structure 1 to join a new zone of accumulation 29 constituted by a rail, as for zone 18, adapted to receive at any point a light automobile vehicle rising from a station 19.

Upon demand of the operators concerned, the accumulation zone 29 supplies five stations 30 with light automobile vehicles 2 which will descend from level C to level B by vertical elevator of the same type as the vertical section 5, for dismantling of the engine, the gear-box and their accessories such as starters, alternator, etc. . . , leaving on the swing-trays 6 only the bodywork elements of the vehicles 2 which cannot be recovered and which constitute the carcasses. In accordance with the implantation shown in FIG. 3 of the five dismantling stations 30, the parts thus recovered are conveyed by a new line 31 supplying a last series of work stations 32 for disconnecting the engines and gear-boxes which, after washing and cleaning at station 28, will join the storage bank 22 by descent towards level A, at point 33 of level B, with return of the empty conveying baskets to point 34 of level B.

The carcasses of the light automobile vehicles 2 are then raised to level C to join a grouping zone 35 for evacuation towards the press 37 and compacting thereof, destined for metal recuperators (arrow M, FIG. 1). The swing-trays 6, empty of their carcasses, join station 4 for loading a new light automobile vehicle 2.

Figure 2:
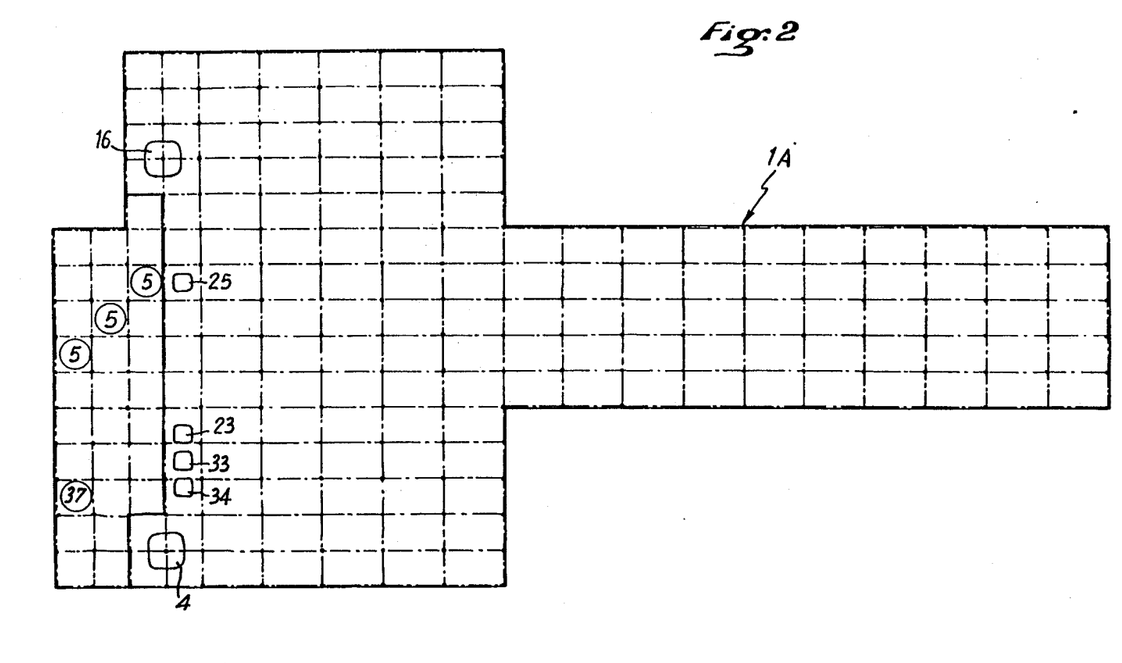
FIGS. 2, 3 and 4 show the implantation of the operating stations and the conveyances of the light automobile vehicles and of the detached parts for carrying out the process according to the invention, respectively at levels A, B and C of the structure constituting the building where this process is carried out.
Figure 5:
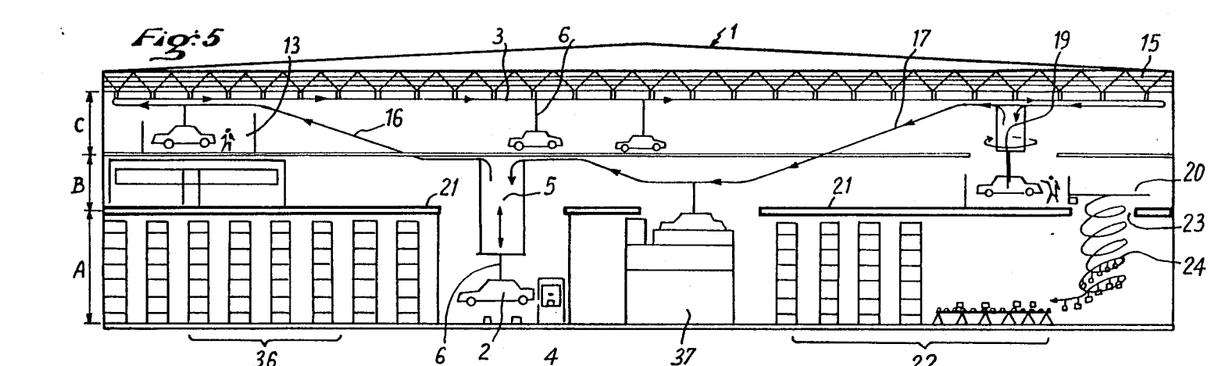
FIG. 5 is a schematic view of the building-structure represented in vertical section of its facade, showing the superposition of the three functional levels of the process according to the invention.
Figure 6A:
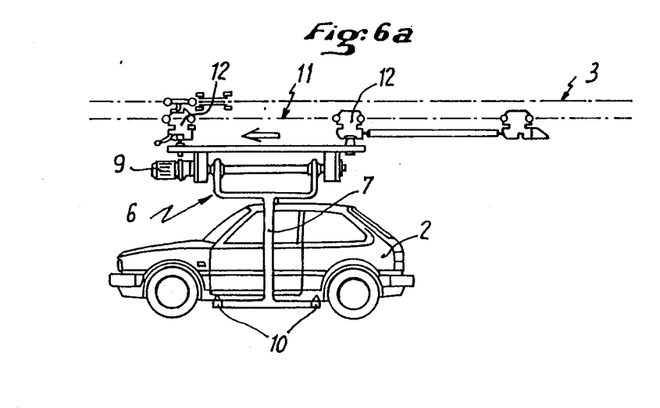
FIGS. 6a and 6b show a side view and a front view of the swing-trays conveying the light automobile vehicles in the vehicle-conveying line according to the process of the invention.
Figure 6B:
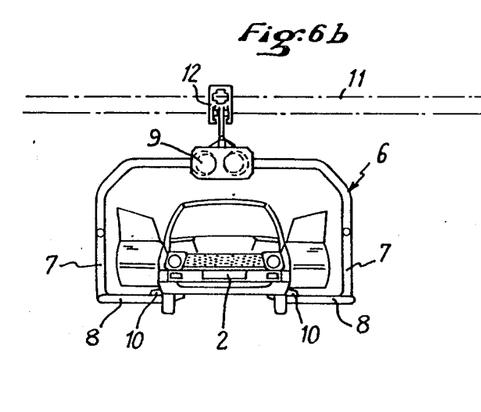

According to FIGS. 2 and 5, level A of structure 1 of the building, located at ground level, may thus receive the heavy weight represented by the storage of detached parts in bins or storage stations 36, on the one hand, or the press 37 for compacting the carcasses of the vehicles 2 on the other hand. All the services in contact with outside the unit will advantageously be reserved at this level A, whether it be a question of purchasing or dispatch services and of in situ sales or for exportation in order to satisfy the renovation market (arrow V, FIG. 1). On the other hand, the space available at level B just below the testing stations 13 located at level C will be reserved for offices for the personnel managing the enterprise, with the advantage of a geographical proximity with the key stations constituted by the various dismantling stations.

Finally, it will be observed that, if the light automobile vehicles 2 arrive at the front facade of structure 1 of the building, the compressed carcasses intended for the metal recuperators, as well as all the operations of purchasing, sales or management, are also located at the front facade; in this way, the possible extension of the demolition unit may be envisaged, with several stations each of 8 hours, by adding complementary modules juxtaposing for example a testing station 13,3×n dismantling stations 19 and n dismantling stations 30—n being any whole number and sub-dismantling stations 26,27,30 and 32 in sufficient quantity, because a simple extension of the building to the rear (which may easily be obtained); in fact, it is relatively simple to juxtapose such modules since it suffices to couple the accumulation zones 14,18,29 on the one hand, grouping zones 35 for evacuation, on the other hand, with the unexpected advantage of an additional increase in the smoothness of the demolition times and consequently an additional gain in productivity. The capacity of the production unit might, of course, also be reduced by eliminating modules. Such modularity of the process furthermore allows all the possibilities of adjustment of the dismantling flow, without departing from the scope of the invention.

What is claimed is:

1. A modular process for dismantling light automobile vehicles for recovery of their detached parts and for recycling in an organized network, and comprising:

providing a three superimposed functional levels building structure;

providing at least one module for carrying out testing, conveyancing, dismantling, recovery, sorting, packing and storing of parts, pressing and evacuation of carcasses;

obtaining for each said module a sum by adding the sum of the number of times for carrying out the operations of testing, of conveyance, of dismantling, of recovery, of sorting, of packing and storing of the sorted parts, of pressing and evacuation of the carcasses, all with respect to the number of vehicles being treated, regardless of the original state of the vehicle parts being treated and the time remains constant over a predetermined period;

conveying the vehicles to be treated along a line for conveying the light automobile vehicles along a conveyor line having therealong stations for dismantling the vehicle by a batch of parts and not by unitary parts, the stations following one another; and each station demand being different and providing the logistics ensuring a supply of material at each station depending on the demand of the operator at a particular station independently of the demand of the operator of the preceding station.

2. The process of claim 1, including:

carrying out the conveyance of the vehicles in a structure with three superimposed functional levels;

carrying out all the operations of conveyance of the light automobile vehicles at the third level and employing overhead conveyors suspended from a framework of the structure;

displacing the light automobile vehicles with the conveyors from one dismantling station to another;

using an elevator for the supply of light automobile vehicles to stations employing an elevator of a vertical elevator conveyor type;

carrying out the operations of loading and unloading the light automobile vehicles on the ground;

carrying out all the operations of dismantling, washing and conveyance of detached parts at the intermediate level; and carrying out the heavy operations of storing the detached parts and of pressing the dismantled carcasses at the ground level whereby to allow a lighter compact structure and an easier, rational offer for sale of various spare parts.

3. The process of claim 2, including:

removing from each module moving along the conveyor line those light automobile vehicles previously sorted to eliminate wrecks impossible to convey;

loading of the light automobile vehicles onto an empty swing-tray carried by a suspended overhead conveyor;

testing by auditive, visual, electronic diagnosis of the light automobile vehicle and establishment of a list of dismantling operations employing data-processing to analyze the state of the parts;

removal of fluids including oils, grease, petrol and water with anti-freeze combination;

dismantling with the same operation of all parts except for engine, gear-box, rear axle and wheels;

conveyance of the detached parts separately to different storage bins;

dismantling and recovery of the wheels;

disconnecting the front axles and the brakes, the engine, gear-box, starter and driving parts and then washing the aforementioned items;

selection of the parts recovered and then packing and storing the parts, and then using a computer for the preparation of orders or the parts; and pressing of the remaining carcasses and evacuation thereof towards metal recuperators and returning of empty swing-trays in order to repeat the modular process cycle.

4. The process of claim 1, including:

adding one or more entire modules or fraction of a module in order to increase capacity of the unit by successive juxtaposition of added modules or the fraction of a module;

coupling supplies of testing stations and each of their dismantling stations to the accumulation zones of the preceding modules;

removal of parts through an exit of the dismantling stations to a grouping zone for evacuation of the carcasses; and adapting the conveying lines of the detached parts to each additional module or fraction of module.

5. The process of claim 1, wherein, for each module, each dismantling operation comprises a certain number of identical stations dependent on the desired capacity of the dismantling unit and on the operation envisaged at these stations which are disposed in parallel and supplied strictly upon demand by each operator from a buffer zone intended to smooth the dismantling flow between successive operations.

6. The process of claim 1, recovering the oils and fuels before dismantling, and using the oils and fuels recovered before dismantling for supplying the generators furnishing the energy necessary for supplying the conveyors and for air-conditioning of the structure.

7. The process of claim 1, including using a portion of the structure as an entrance and as an exit, both on the same level, for mobile vehicles to be dismantled when they arrive and when the pressed carcasses depart, on the same portion of the structure, thus making it possible to accumulate at another portion of said structure as many modules, or fractions of a module, as necessary.

8. A modular process for dismantling light automobile vehicles to recover and recycle parts which are considered reusable as replacement parts in a secondary market, comprising:

providing at least one basic module for treating a constant quantity of vehicles per day, even though there is no uniformity in the vehicles to be treated because of the nature of the reason for the vehicles to be dismantled and differences in the parts to be recovered and the parts to be discarded as non-recoverable;

sorting the vehicles at a sorting station into two groups after examining the vehicles to determine those which have recoverable parts and placing them into a first group and those which are too damaged to have useful recoverable parts and placing them into a second group;

conveying those vehicles in said first group by a first conveyor line to three loading stations at a place displaced from said sorting station;

subjecting the vehicles at the loading stations to various tests to ascertain the state of each element of the vehicle, said subjecting step including inspection by visual, auditive, electrical, electronic and mechanical measuring controls for determining which of the elements are to be further recovered and sold and which are to be disposed of by recovery of metals;

providing a computerized control for each vehicle with a card therefor containing information concerning the elements of each vehicle as to which is to be dismantled and sold and which is to be recovered as metal;

providing a plurality of dismantling stations equipped with a complete set of dismantling equipment for rendering the operator entirely independent, and dismantling the vehicle completely but leaving the engine, wheel axles, gear-boxes and direct accessories therefor;

providing a second conveyor line for collecting the dismantled parts and placing the dismantled parts into a basket carried by said second conveyor line and directing them to a parts storage bank for reusable parts;

providing wheels and tires dismantling stations solely for the dismantling of wheels and tires, and moving the vehicle to the dismantling station for dismantling of the wheels and tires;

providing a further dismantling station for the dismantling of front wheel axles, brakes and universal joints, and moving the vehicle to the further dismantling station for the further dismantling thereof;

washing the front wheel axles, brakes and universal joints for degreasing thereof and then conveying the degreased parts to said storage bank;

moving the vehicles to an accumulation zone after all of the preceding dismantling operations are carried out;

further dismantling the engine, gear-box and accessories at another station including starters and alternators to leave only the portion that cannot be dismantled and forming the carcasses of the vehicle; and conveying the last-mentioned dismantled parts to a washing station for washing thereof and then conveying the engine and gear-boxes to the storage bank.

9. The modular process of claim 8, including:
providing a building having three levels, a conveyor mechanism for conveying the first group of vehicles among the three levels for carrying out operations on the first group of vehicles;
providing said building with an entrance and exit proximate to each other and at the lowest of the three levels, the uppermost level including the loading stations for ascertaining the state of each element of the vehicle;
said building including rails forming part of said conveyor and the vehicles and parts thereof after dismantling being conveyed to the exit.

10. The modular process of claim 9, including:
providing swing-trays for transporting the vehicles of the first group from the sorting station to the loading station;
said swing-trays having a cradle for carrying the vehicle, arms terminating in the cradle, and punches driven into the body of the vehicle carried by the cradle;
the cradle carrying the vehicle to the different dismantling stations and after all of the various parts are removed from the vehicle, the cradle carries that portion of the vehicle designated as the carcass for conveyance to a press for compacting of the carcass; and
said swing-trays having the vehicles removed therefrom at the exit and placed at the entrance for the reception of a new group of vehicles from another first group of vehicles at the loading station.

11. The modular process of claim 9, including:
providing a first buffer zone for positioning vehicles waiting to be moved to said loading station;
said first buffer zone being provided at an intermediate level positioned between the uppermost and lowermost levels; and
allowing operators to control the movement to the uppermost level depending on the operators rate of dismantling of the vehicles being dismantled.

12. The method of claim 9, including:
raising all of the vehicles to the uppermost level;
an accumulation zone being provided at said uppermost level after dismantling for accumulation of the items to be recycled.

13. The method of claim 9, including providing purchasing and dispatch services for the reusable parts on the lower level.

14. The method of claim 9, including providing personnel management offices at the intermediate level to provide geographical proximity with key stations constituted by the various dismantling stations.

15. The modular process of claim 9, including:
effecting all of the conveyance of the automobile vehicles at the uppermost level;
providing overhead conveyors at the third level which are suspended from a framework coupled with the structure;
carrying out the operations of loading the vehicles onto the module and unloading the vehicles from the module on the lowermost level;
carrying out all of the dismantling operations, washing operations and conveyance of detached parts at the intermediate level;
carrying out at the lowermost level all of the heavy operations of storing the detached parts and of pressing the dismantled carcasses; and
disposing of unwanted carcasses at the lowermost level.

16. The modular process of claim 8, including:
providing swing-trays for transporting the vehicles of the first group from the sorting station to the loading station;
said swing-trays having a cradle for carrying the vehicle, arms terminating in the cradle, and punches driven into the body of the vehicle carried by the cradle;
the cradle carrying the vehicle to the different dismantling stations and after all of the various parts are removed from the vehicle, the cradle carries that portion of the vehicle designated as the carcass for conveyance to a press for compacting of the carcass.

17. The modular process of claim 8, including:

providing at least one line of conveyance for conveying those vehicles to stations for dismantling and allocating to batch of parts; and supplying the vehicles to the dismantling stations at a rate depending on the demand of the operator at the station for receiving the vehicle to be dismantled independently of the demand of the operator at the station from which the vehicle to be dismantled is to be received.

* * * * *